(12) United States Patent
Hamilton et al.

(10) Patent No.: US 8,504,252 B2
(45) Date of Patent: Aug. 6, 2013

(54) TRACKING CARBON OUTPUT IN AGRICULTURAL APPLICATIONS

(75) Inventors: Jeffrey Allen Hamilton, Broomfield, CO (US); Gregory D. Chiocco, Sunnyvale, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 478 days.

(21) Appl. No.: 12/902,013

(22) Filed: Oct. 11, 2010

(65) Prior Publication Data
US 2012/0089304 A1  Apr. 12, 2012

(51) Int. Cl.
*G06F 7/70* (2006.01)

(52) U.S. Cl.
USPC .......................................................... 701/50

(58) Field of Classification Search
None
See application file for complete search history.

(56) References Cited

U.S. PATENT DOCUMENTS

| | | | |
|---|---|---|---|
| 2005/0173153 A1* | 8/2005 | Alft et al. ................ | 175/46 |
| 2007/0240903 A1* | 10/2007 | Alft et al. ................ | 175/50 |
| 2009/0278839 A1 | 11/2009 | Geis et al. | |
| 2010/0332294 A1 | 12/2010 | Geis et al. | |

FOREIGN PATENT DOCUMENTS
WO  WO 2011-002707  1/2011

OTHER PUBLICATIONS

Alphasense "Solid State Carbon Dioxide Sensor" web article downloaded Jul. 22, 2010; alphasense.com/.../co2_carbon_dioxid . . . ; 1 page.
Alphasense Ltd, "CO2-D1 Carbon Dioxide Sensor Solid State" Technical Specification; Doc. Ref. CO2D1/FEB09; 2 pages.
Rastogi et al. "Emission of carbon dioxide from soil," Current Science (2002), 82(5):510-517.
Sainju et al. "Soil Carbon Dioxide Emission as Influenced by Irrigation, Tillage, Cropping System, and Nitrogen Fertilization," Workshop on Agricultural Air Quality (Jun. 5-8, 2006) pp. 1086-1098.
Vogt, "Making leap from data to knowledge" Dakota Farmer, Oct. 2010, p. 53.

* cited by examiner

*Primary Examiner* — Thomas Tarcza
*Assistant Examiner* — Adam Alharbi
(74) *Attorney, Agent, or Firm* — Swanson & Bratschun, L.L.C.

(57) ABSTRACT

Novel tools and techniques to enhance and/or facilitate the collection, tracking, and/or verification of greenhouse gas emissions and/or savings, particularly (but not exclusively) in agricultural applications. Some tools, for example, can assist in the verification of carbon credits that may result from conservation tilling activities. Other embodiments can track greenhouse gas emissions that result from agricultural activities, including without limitation the application of pesticides, fertilizers, and/or other agricultural chemicals.

38 Claims, 6 Drawing Sheets

TRACKING CARBON OUTPUT IN AGRICULTURAL APPLICATIONS

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to tracking greenhouse gas emissions and credits, and more particularly, to tools and techniques for tracking the atmospheric carbon impact (or carbon-equivalent) impact of agricultural operations.

BACKGROUND

Concerns about climate change have resulted in increasing attention on tracking and controlling emissions of atmospheric carbon and other greenhouse gases. Much of this attention has been focused on two areas: road-going vehicles and industrial emissions. Other sectors of the economy, however, merit attention as well.

Merely by way of example, agricultural activities can have a substantial impact on atmospheric carbon. Monika Rastogi, et al., "Emission of Carbon Dioxide from Soil," *Current Science*, vol. 82, no. 5 (Mar. 10, 2002), pp. 510-17, which is hereby incorporated by reference, describes the complex interactions between agriculture and atmospheric carbon. For instance, emissions from agricultural vehicles such as tractors, combines, and/or the like increase atmospheric carbon in the presence of other greenhouse gases, in the same way that emissions from other vehicles do. Moreover, many agricultural chemicals, such as pesticides and fertilizers, and/or the like contain nitrogen and/or other compounds that may aerosolize and/or evaporate during or after application, thereby adding greenhouse gases to the environment. On the other side of the ledger, agricultural crops serve as carbon sequestration vehicles, in that they capture dioxide and convert the carbon into solid form.

While much of the sequestered carbon is harvested with the crops, a substantial portion remains in the fields as stubble. This stubble can be beneficial, in that it can add nutrients to the soil for future crops; accordingly, in many cases, a field is tilled, disked, or otherwise turned over after harvest and/or before planting season. The nature of the tilling activities can have a substantial impact on how much carbon remain sequestered and how much, conversely, is released into the atmosphere.

For example, conventional tilling disturbs a significant amount of soil and therefore releases significant carbon into the atmosphere. Conservation tilling, on the other hand, seeks to disturb significantly less soil than traditional methods, and therefore leave significantly more carbon undisturbed and sequestered.

As a result, farmers can realize carbon credits through the use of conservation tilling. Merely by way of example, the Chicago Climate Exchange® ("CCX®") offers soil carbon management offsets to farmers to pledge to engage in conservation telling (e.g., no-till and strip-till farming), provided such activities meet the CCX's requirements. For example, to qualify for soil carbon management offsets, a tillage practice must leave at least two thirds of the soil surface undisturbed at least two thirds of the residue remaining on the field surface. The CCX also requires all carbon sequestration projects to be enrolled through a registered carbon offset aggregator, and it requires all projects to be subject to verification.

A similar problem exists with respect to the application of agricultural chemicals. While it is known that agricultural chemicals can contribute greenhouse gases to the atmosphere, the amount of greenhouse gases emitted during the application of such chemicals is difficult to measure, because the emissions depend heavily on the nature of the application as well as prevailing environmental conditions. Accordingly, it is difficult to measure and/or verify any greenhouse gas emissions, or savings, related to the application of agricultural chemicals.

Presently, the process of verification is a time-intensive, and therefore expensive, process that requires manual inspection of tillage areas. Hence, there is a need for more robust and/or flexible tools and techniques for tracking and/or verifying greenhouse gas emissions and/or carbon sequestration projects, including but not limited to farming activities. It would be helpful for such tools and techniques to be able to track additional carbon impacts of such activities (e.g., vehicular emissions, emissions from chemical application, and/or the like).

BRIEF SUMMARY

Certain embodiments, therefore, provide tools and techniques to enhance and/or facilitate the collection, tracking, and/or verification of greenhouse gas emissions and/or savings, particularly (but not exclusively) in agricultural applications. Some embodiments, for example, can assist in the verification of carbon credits that may result from conservation tilling activities. Other embodiments can track greenhouse gas emissions that result from agricultural activities, including without limitation the application of pesticides, fertilizers, and/or other agricultural chemicals.

One set of embodiments includes field components that are attendant to agricultural equipment in use; these components can track agricultural activities as they occur, and, in some cases, can communicate with a carbon tracking server to relay collected data for further analysis. Other embodiments include a carbon tracking server, which can receive data from equipment in the field and can calculate emissions of carbon and carbon equivalents into the atmosphere. The carbon tracking server, in some cases, can also verify any carbon credits and provide relevant output, e.g., for a user, for a climate exchange, and/or the like.

In an aspect, certain embodiments can provide a relatively high degree of precision in measuring agricultural activities. Merely by way of example, some embodiments can track the location of a tilling implement to within sufficient precision to allow the system to calculate the effects of the activity itself on atmospheric carbon, rather than estimating the effects based on an overall area of the tilled field. Similarly, other embodiments can track agricultural spraying applications with a relatively high degree of precision, which can not only enable the longitudinal tracking of chemicals applied over time to individual plants, but can also allow for atmospheric carbon calculations that account for characteristics of the spraying activity, rather than merely the net amount of chemicals applied to an entire field.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible and/or non-transitory computer readable media (such as, to name but a few examples, optical media, magnetic media, and/or the like).

Merely by way of example, one set of embodiments provides systems, including without limitation systems for tracking and/or verifying atmospheric impacts of agricultural activities. One exemplary system includes a mobile unit. In one embodiment, the mobile unit comprises a position sensing device, which may be configured to track the location of a conservation tilling activity. In some cases, the mobile unit may also comprise a soil monitoring device, which can be configured to monitor one or more soil conditions at the location of the conservation tilling activity. The mobile unit might further comprise a communication system that is configured to transmit a set of data about the location of the conservation tilling activity and one or more soil conditions at the location of the conservation tilling activity.

In some embodiments, the system may comprise a server computer, which may be in communication with a mobile unit. For example, the server computer might comprise a second communication system configured to receive, from a mobile unit, a set of data about the location of the conservation tilling activity and one or more soil conditions at the location of the conservation tilling activity. In an aspect, the server might also include a data store (e.g., a database, file system, etc.) for storing the set of data, and/or a processor in communication with the second communication system and the data store.

In another aspect, the server computer might include a computer readable medium having stored thereon a set of instructions executable by the processor to cause the server computer to perform one or more operations. In an exemplary embodiment, the set of instructions might comprise instructions to store the set of data at the data store and/or instructions to calculate, based at least in part on the set of data, an amount of atmospheric carbon released by the conservation tilling activity. In another aspect, the set of instructions might include instructions to verify, based at least in part on the calculated amount of carbon released by the conservation tilling activity, a carbon credit amount attributable to the conservation tilling activity, and/or instructions to generate output indicating the verified amount of carbon credit attributable to the conservation tilling activity.

In some embodiments, the system might include both one or more mobile units and a server computer system. For example, another exemplary system might comprise a mobile unit having a position sensing device configured to track a location of an agricultural spraying activity, a chemical monitoring device configured to monitor an amount of an agricultural chemical sprayed as part of the agricultural spraying activity, and/or a first communication system configured to transmit a set of data about the location of agricultural spraying activity and the amount of the agricultural chemical being applied at the location of the agricultural spraying activity.

The system might further comprise a server computer in communication with the mobile unit, comprising a second communication system configured to receive the set of data about the location of the agricultural spraying activity and the amount of the agricultural chemical being sprayed as part of the agricultural spraying activity. The server computer might further comprise a data store for storing the set of data, and/or a processor in communication with the second communication system and the data store.

In an aspect, the server computer might further comprise a computer readable medium having stored thereon a set of instructions executable by the processor to cause the server computer to perform one or more operations. For example, the set of instructions might include instructions to store the set of data at the data store, instructions to calculate, based at least in part on the set of data, an amount of atmospheric carbon equivalent generated by the agricultural spraying activity, instructions to verify, based at least in part on the calculated amount of atmospheric carbon equivalent generated by the agricultural spraying activity, and/or instructions to generate output indicating the verified amount of carbon credit attributable to the agricultural spraying activity.

Another set of embodiments provides methods. An exemplary method might comprise tracking, with a position sensing device, a location of a conservation tilling activity. In some embodiments, the method might further comprise monitoring, with a monitoring device, one or more soil conditions at the location of the conservation tilling activity, and/or calculating, with a computer system, an amount of atmospheric carbon released by the conservation tilling activity, based at least in part on data about the location of the conservation tilling activity and the one or more soil conditions at the location of the conservation tilling activity. In other embodiments, the method might also comprise verifying, based at least in part on the calculated amount of carbon released by the conservation tilling activity, a carbon credit amount attributable to the conservation tilling activity, and/or generating output indicating the verified amount of carbon credit attributable to the conservation tilling activity.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
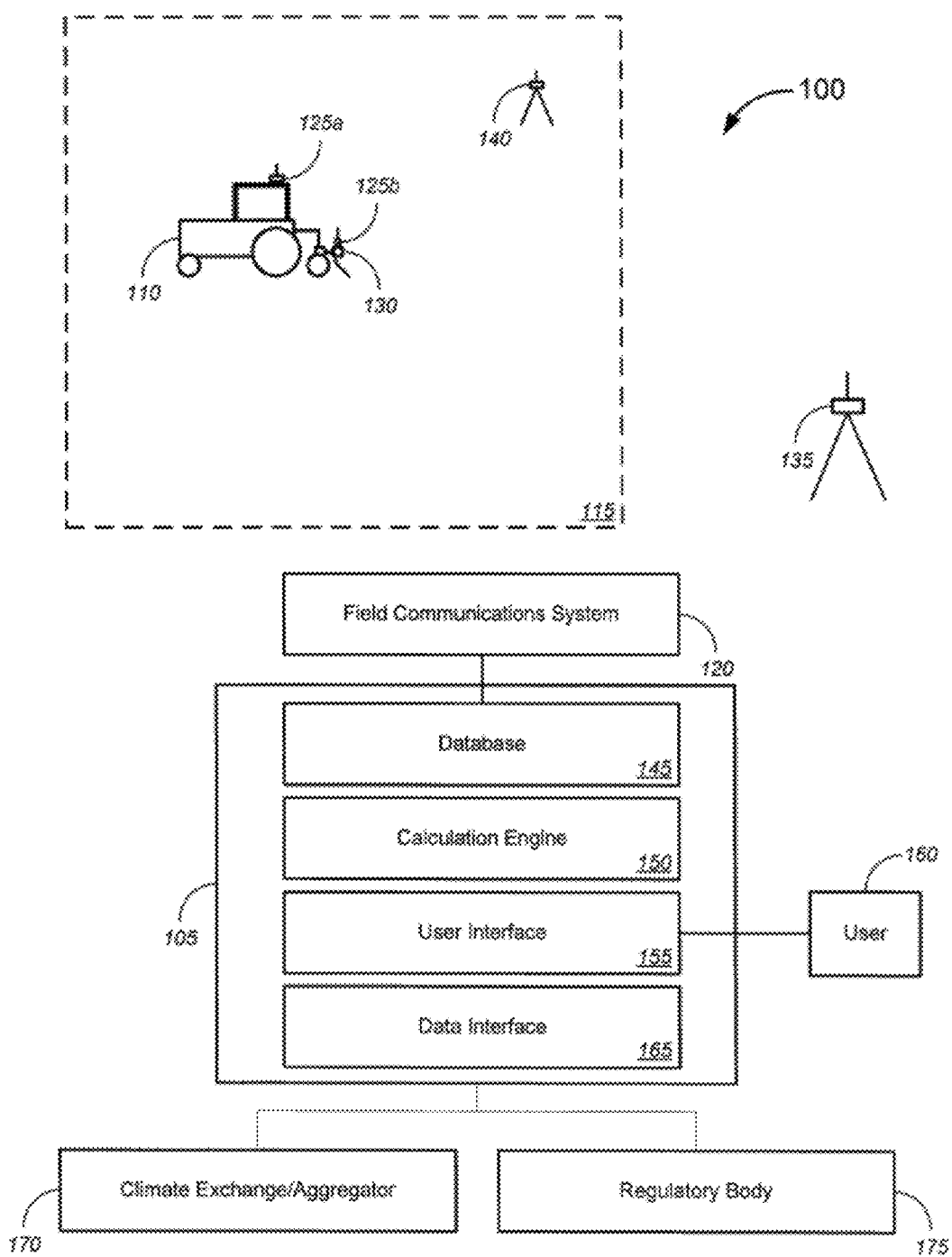
FIG. 1 is a block diagram illustrating a system for collecting and/or verifying data about agricultural operations, in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

A set of embodiments provides tools and techniques to enhance and/or facilitates the collection, tracking, and/or verification of greenhouse gas emissions and/or savings, particularly (but not exclusively) in agricultural applications. Some embodiments, for example, can assist in the verification of carbon credits that may result from conservation tilling activities. Other embodiments can track greenhouse gas emissions that result from agricultural activities, including without limitation the application of pesticides, fertilizers, and/or other agricultural chemicals.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

One set of embodiments includes field components that are attendant to agricultural equipment in use; these components can track agricultural activities as they occur, and, in some cases, can communicate with a carbon tracking server to relay collected data for further analysis. Other embodiments include a carbon tracking server, which can receive data from equipment in the field and can calculate emissions of carbon and carbon equivalents into the atmosphere. The carbon tracking server, in some cases, can also verify any carbon credits and provide relevant output, e.g., for a user, for a climate exchange, and/or the like.

Merely by way of example, FIG. 1 illustrates a system 100 that includes both field equipment and a carbon tracking server 105. The system 100 of FIG. 1 has the ability to track the activities of agricultural equipment, such as a tractor 110 operating in an agricultural area 115, such as a field. While FIG. 1 illustrates only a single tractor 110 in one agricultural area 115, it should be appreciated that various embodiments to track the activities of a variety of different numbers and types of agricultural equipment in many different areas. The system 100 can track a number of different activities, including without limitation tilling activities (in which the ground of the agricultural area 115 is disturbed to facilitate the planting of new seeds), seeding activities (in which new seeds are planted in the agricultural area 115), spraying activities (in which pesticides, fertilizers, and/or other chemicals are applied to plants in the agricultural area 115), and/or harvesting activities.

As illustrated by FIG. 1, the system 100 includes a field communication system 120, which provides communication between the carbon tracking server 105 and the agricultural equipment. In one aspect, the field communication system 120 may be considered part of the carbon tracking server, while in another aspect, the field communication system 120 may be separate from the server 105. In either case, the field communication system 120 allows for communication between the server 105 and a mobile unit 125 that is associated with the agricultural equipment 110 and/or an implement 130 operated by the agricultural equipment. The implement 130 can be any implement that is used for agricultural operations, including without limitation a tiller, disc, harvester, plow, sprayer, seeder, and/or the like.

In an embodiment, a mobile unit 125 includes any components necessary for tracking the desired agricultural activity. Merely by way of example, in one embodiment, a mobile unit 125 might comprise a position sensing device configured to track the location of the activity. Such a device can include, without limitation, a global navigation satellite system ("GNSS"), of which the Global Positioning System ("GPS") is one example, which can provide position information that is absolute (in other words, relative to a known coordinate system). Other types of position sensing devices that can be employed by various embodiments include laser-based and/or optics-based position determination systems, of which the laser total stations and optical total stations, commercially available from Trimble Navigation Ltd. are two respective examples. The position sensing device can also include additional equipment, such as a camera, that can provide position information about the location of an implement 130, relative to the mobile unit 125 itself and/or another reference location, to provide precise location information about the implement 130. In this regard, a position sensing device might include a processor in the mobile unit 125 (or elsewhere) that is configured to calculate position, including in particular implement 130 position, relative to a known coordinate system.

In certain embodiments, the mobile unit 125 can also include one or more sensors to detect ambient environmental conditions, which can affect carbon emission calculations. Merely by way of example, if the system 100 is designed to track tilling activities, and/or other agricultural activities that may have an impact on soil, the mobile unit 125 may comprise a soil monitoring device that is configured to monitor one or more soil conditions, such as soil moisture level, soil temperature, and/or the like, during the tilling activity. Such a sensor may be positioned on the tilling implement to allow for measurement as part of the tilling operation. As another example, the mobile unit 125 might include sensors to monitor conditions such as ambient air temperature, wind velocity and/or direction, atmospheric humidity (and/or air moisture content), and/or the like. Such sensors can provide data used to calculate dispersion of chemicals in spraying operations, among other things. Some mobile units might include sensors to directly monitor carbon dioxide (or other greenhouse gas) emissions. An example of one such sensor is the CO2-D1 Solid State Carbon Dioxide Sensor, commercially available from Alphasense, Ltd., Great Notley, UK In other embodiments, the mobile unit 125 can include an image capture device, such as a video camera, still camera, and/or the like, which can be used for visual identification purposes. Merely by way of example, in some cases, a camera on or in the mobile unit can be used to capture an image of the implement 130, and image recognition software can then be used to identify the implement 130. The image capture device can also be used to create a visual record of the agricultural activities; such a visual record may be used in the verification process, as described in further detail below.

The mobile unit 125 also can include a communication system, which can be used to provide communication (e.g., through the field communication system 120) with the server 105. The communication between the mobile units communication system and the field communication system 120 can be of any suitable type, including without limitation wireless, e.g., (CDMA, GSM, 3G, 4G, WiFi, WiMAX, etc., wired (ethernet, PSTN, Internet, etc.) and/or the like. In some embodiments, the system 100 will use a combination of these technologies to provide mediation between the field communication system 120 and the mobile unit 125. Merely by way of example, the mobile unit 125 might communicate wirelessly with a base station 135 is proximate to the agricultural area 115, and the base station 135 might communicate with the field communication system 120 over a public network such as the PSTN or the Internet.

In some cases, the base station 135 (which could be, but need not necessarily be, a cellular base station, WiFi router, and/or the like) might be a sufficient distance from the agricultural area 115, and more particularly the mobile unit 125, to prevent adequate communication between the mobile unit 125 and the base station 135, and in such cases, the system 100 might include a relay station 140, which can be used to relay signals between the mobile unit 125 and the base station 135. This relay station may be located at a farmhouse, etc. and/or maybe otherwise located in the suitable location at or near the agricultural area 115. In some cases the agricultural area 115 may have a plurality of relay stations 140 to provide adequate coverage between the mobile unit 125 and the base station 135. Those skilled in the art will appreciate that a variety of wireless topologies may be used to ensure adequate communication between the mobile unit and the base station 135.

The mobile unit 125 may also include one or more sensors for measuring vehicle emissions from the agricultural equipment 110. In some cases, for example, these sensors might include emissions sensors (which might be integrated with the exhaust system of the agricultural equipment 110), fuel consumption sensors, and/or the like. Such sensors can be used to collect data about vehicle emissions, which can be used by the system 100 to refine calculations and/or are estimates of overall atmospheric carbon impact of the agricultural activities, as described in further detail below.

Those skilled in the art will appreciate that modern agricultural equipment often has an engine and/or implement bus that is configured for communication with a computer system for diagnostic and other purposes. In certain embodiments, the mobile unit 125 may be configured to interface with such a bus, obtain relevant data from such a bus, comprise such a bus, and/or be incorporated within such a bus.

In some cases, a mobile unit 125a may be mounted on, installed in, and/or otherwise associated with, a tractor 110 (or similar equipment). In other cases, a mobile unit 125b may be mounted on, installed on, and/or otherwise associated with, a particular implement 130, such as a till, sprayer, seeder, swather, harvester, and/or the like. (It should be noted that various embodiments can be used with implements that are designed for use with a general-purpose tractor as well as for purpose-built farm equipment that employs such implements or similar functionality.) In further cases, the system may include a first mobile unit 125a and a second mobile unit 125b. The second mobile unit 125b, for example, might provide precise tracking of the activities of the implement 130, while the first mobile unit 125a might track other operations of the equipment 110 and/or might provide communication capabilities. For instance, in some cases, the second mobile unit 125b might include relatively short range communication capabilities (e.g. RFID, Bluetooth, IEEE 802.11, wired communication, and/or the like), while the first mobile unit 125a might provide enhanced processing capabilities and/or long range communication capabilities (e.g., 802.11, WiMAX, cellular/CDMA/GSM/etc., and/or the like), in addition to any short range communication capabilities necessary for communicating with the second mobile unit 125b.

In a particular embodiment, the second mobile unit 125b might comprise little more than an RFID tag, which can be read by the first mobile unit 125a, in order to identify the implement 130 is currently attached to the tractor 110. Merely by way of example, commonly-assigned, copending U.S. patent application Ser. Nos. 12/177,772 and 12/177,777, both of which are incorporated herein by reference, describe different techniques, including RFID, for identifying an implement; any of such techniques can be used in accordance with various embodiments.

The first mobile unit 125a, then, might store (and or have access to) a database that lists the characteristics of the implement 130. Thus, by identifying the implement 130 using information obtained from the RFID tag, the first mobile unit 125a can determine the properties of the implement, such as the precise location (relative to a reference point on the tractor 110) of each tine of a tilling implement, the spray head of a sprayer implement, and/or the like.

Of course, the second mobile unit 125b might also have additional functionality. Merely by way of example, the second mobile unit may include a flow meter to detect an amount of chemical sprayed, cameras or other sensors to perform visual identification (as described below, for example), and/or the like. It should be appreciated, of course, that either mobile unit 125a or 125b could be configured to function on its own and provide all the capabilities necessary for activity tracking and communication.

The carbon tracking server 105 is illustrated functionally by FIG. 1, and it should be appreciated that the functionality ascribed to various components of the server 105 can be rearranged in accordance with various embodiments. As illustrated, the server 105 includes a database 145 (or other data store, depending on the implementation), which can be used to store data received from one or more mobile units 125, as well as the results of the analysis and calculations performed by the carbon tracking server 105. The carbon tracking server 105, in the illustrated embodiment, also includes a calculation engine 150, which performs the calculations and analysis described in further detail below to track the atmospheric carbon impact of agricultural activities and/or any associated carbon credits.

The carbon tracking server 105 may also include a user interface 155, which can be used to provide interaction with a user 160 (for example, to display output from the calculation engine 150). A variety of user interfaces may be provided in accordance with various embodiments, including without limitation graphical user interfaces that display, for a user, display screens for providing information to the user and/or receiving user input from a user.

Merely by way of example, in some embodiments, the server 105 may be configured to communicate with a client computer via a dedicated application running on the client computer (not shown on FIG. 1); in this situation, the user interface 155 might be displayed by the client computer, based on data and/or instructions provided by the server 105. In this situation, providing the user interface might comprise providing instructions and/or data to cause the client computer to display the user interface. In other embodiments, the user interface may be provided from a web site, e.g., by providing a set of one or more web pages, which might be displayed in a web browser running on the user computer and/or might be served by a web server (not shown on FIG. 1). In various embodiments, the carbon tracking server 105 might comprise the web server and/or be in communication with the web server, such that the carbon tracking server 105 provides data to the web server to be incorporated in web pages served by the web server for reception and/or display by a browser at the user computer.

In certain embodiments, the carbon tracking server 105 further includes a data interface 165, which can provide data interchange capabilities with third-party systems, such as a climate exchange and/or carbon credit aggregator 170, and/or a regulatory body 175, such as the United States Environmental Protection Agency or International Panel on Climate Change ("IPCC"), to name a few examples. The data interface 165 may implement any of a variety of application programming interfaces ("API"), web services, and/or data exchange formats, such as XML and/or other structured formats, proprietary binary and/or text formats, and/or the like.

In an aspect, certain embodiments can provide a relatively high degree of precision in measuring agricultural activities. Merely by way of example, some embodiments can track the location of a tilling implement to within sufficient precision to allow the system to calculate the effects of the activity itself on atmospheric carbon, rather than estimating the effects based on an overall area of the tilled field. For instance, in some embodiments, a GNSS device at the mobile unit can be used to identify, within a precision of approximately 3 to 6 cm, the location of the mobile unit itself. Further, based on an identification of the implement 130, the mobile unit 125 can calculate the position of the implement 130 relative to the mobile unit 125. From this data, the mobile unit 125 calculate the position of the implement 130 to within approximately the same precision. As described below, these location fixes can be performed iteratively, to calculate a path of the implement 130. From this path, in addition to the known width of the implement 130, the area of soil actually disturbed by the implement in the agricultural area 115 can be calculated.

Similarly, other embodiments can track agricultural spraying applications with a relatively high degree of precision, which can not only enable the longitudinal tracking of chemicals applied over time to individual plants, but can also allow for atmospheric carbon calculations that account for characteristics of the spraying activity, rather than merely the net amount of chemicals applied to an entire field.

As noted above, the carbon tracking server 105 is illustrated functionally in FIG. 1, and a variety of other configurations are possible within the scope of several embodiments. Merely by way of example, although FIG. 1 illustrates the carbon tracking server 105 monolithically, the carbon tracking server 105 might comprise two or more computer systems, with the functionality of the carbon tracking server 105 distributed among them. Similarly, while FIG. 1 illustrates the carbon tracking server 105 as being remote from the agricultural area 115, in other embodiments, the carbon tracking server 105 might be situated locally to the agricultural area 115.

Moreover, in certain embodiments, some or all of the functionality of the carbon tracking server 115 might reside in one or more of the mobile units 125. Merely by way of example, in some embodiments, a mobile unit 125 might comprise a sensor package (as described above), as well as a processor that is capable of performing some or all of the functions of the carbon tracking server 105. Depending on the embodiment, a variety of different processors could be used; for example, in some cases, a mobile unit might comprise a workstation- or server-class processor (and related hardware), such that the mobile unit 125 effectively comprises (and/or is incorporated within) a laptop, workstation, or server computer, which could be configured for installation within an agricultural vehicle 110, for example. In other cases, "mobile" hardware may be sufficient to perform these functions, such that a device similar to a personal digital assistant (perhaps with wireless connectivity) and/or a smart phone, which might be installed in and/or local to the agricultural vehicle 110, can serve as a carbon tracking server.

Figure 2:
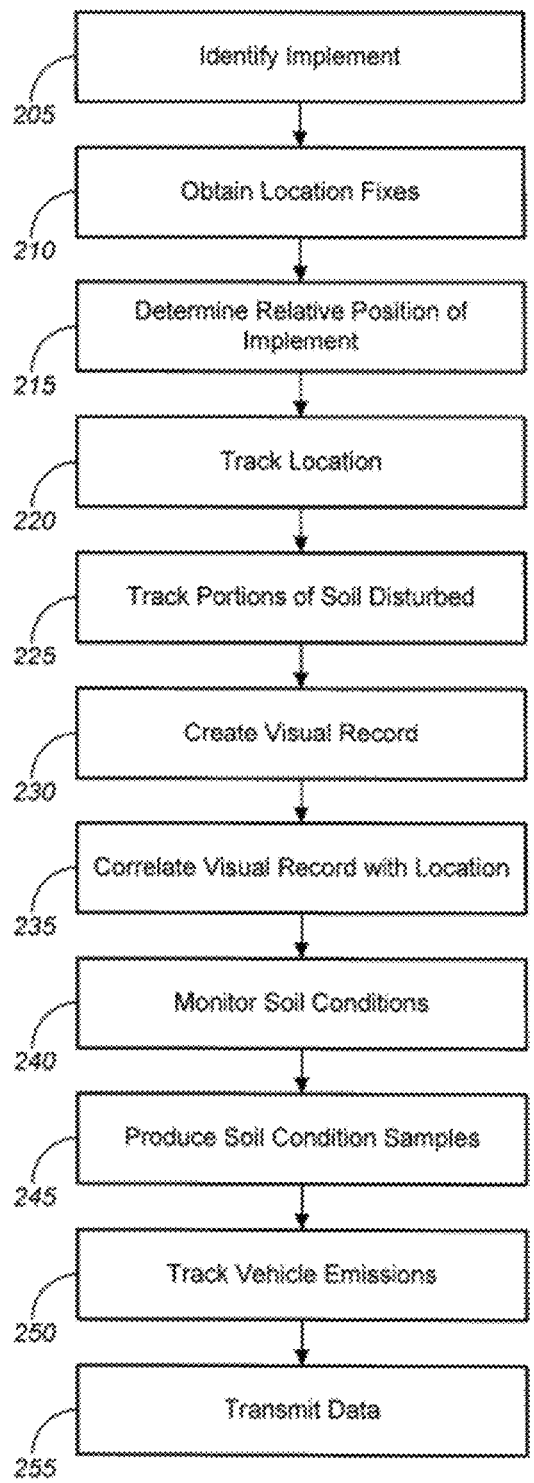
FIG. 2 is a process flow diagram illustrating a method of collecting data about tilling operations, in accordance with various embodiments.
Figure 3:
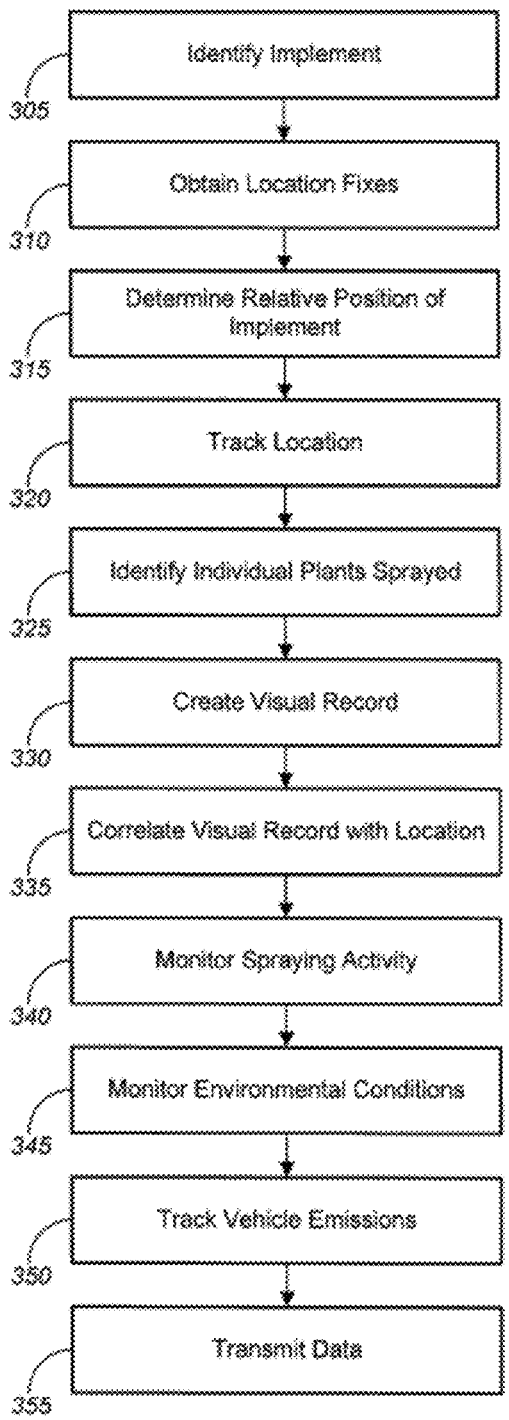
FIG. 3 is a process flow diagram illustrating a method of collecting data about spraying operations, in accordance with various embodiments.
Figure 4:
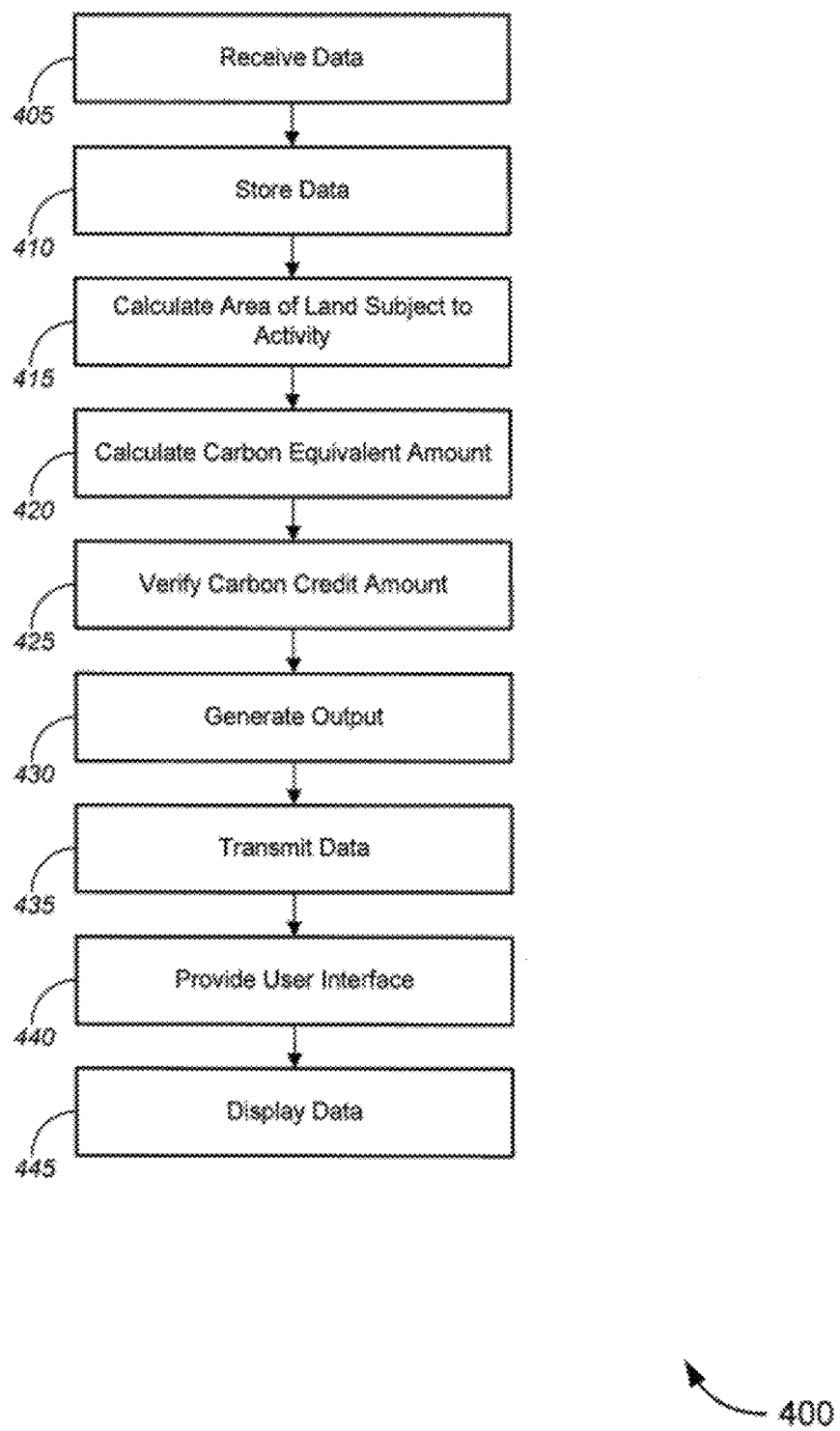
FIG. 4 is a process flow diagram illustrating a method of tracking, calculating, and/or verifying data about atmospheric impacts of agricultural operations, in accordance with various embodiments.

FIGS. 2-4 illustrate various methods that can be used to track agricultural activities, calculate atmospheric carbon impact of such activities, and/or verify such impact, to facilitate the process of obtaining carbon credits for such activities. While the methods of FIGS. 2-4 are illustrated, for ease of description, as different methods, it should be appreciated that the various techniques and procedures of these methods can be combined in any suitable fashion, and that, in some embodiments, the methods depicted by FIGS. 2-4 can be considered interoperable and/or as portions of a single method. Similarly, while the techniques and procedures are depicted and/or described in a certain order for purposes of illustration, it should be appreciated that certain procedures may be reordered and/or omitted within the scope of various embodiments. Moreover, while the methods illustrated by FIGS. 2-4 can be implemented by (and, in some cases, are described below with respect to) the system 100 of FIG. 1 (or components thereof), these methods may also be implemented using any suitable hardware implementation. Similarly, while the system 100 of FIG. 1 (and/or components thereof) can operate according to the methods illustrated by FIGS. 2-4 (e.g., by executing instructions embodied on a computer readable medium), the system 100 can also operate according to other modes of operation and/or perform other suitable procedures.

FIG. 2 illustrates a method 200 of collecting data about agricultural activities, and in particular, activities that disturb soil, including without limitation tilling activities (and more specifically conservation tilling activities). The method 200 comprises identifying an agricultural implement involved in the agricultural activity (block 205). In many cases, this implement will be associated (at least for the duration of the activity) with an agricultural vehicle performing the activity. As noted above, in many embodiments, a mobile unit mounted on either the vehicle and/or the implement itself can be used to identify the implement.

A variety of techniques can be used to identify the implement. Merely by way of example, in some embodiments, the implement may be tagged with an identification tag (such as an RFID tag, WiFi transceiver, etc.), and a mobile unit may comprise hardware that can interrogate the tag (and/or otherwise receive information from the tag), and the implement can be identified based on information received from the tag. As another example, a mobile unit may be exclusively associated with the implement, and the identity of the mobile unit itself and serve as a proxy for the identity of the implement. In other embodiments, an image capture device can be used to capture an image of the implement, and identification may be made based on this image (e.g., through pattern recognition techniques). In still other embodiments, the mobile unit may receive user input (e.g. via a user interface at the mobile unit and/or another device).

At block 210, the method 200 comprises obtaining one or more location fixes. Any type of position sensing device can be used to obtain such location fixes. As noted above, in some embodiments, a mobile unit may comprise a GNSS receiver and/or other position sensing equipment, and the location of the implement can be derived from position data received by the mobile unit and/or information about the relative positions of the mobile unit and the implement, which can be determined based on the identity of the implement. Accordingly, the method 200 may further comprise, if necessary, determining a position of the implement relative to the mobile unit (and/or the position sensing device with which location fixes are obtained) (block 215). Alternatively and/or additionally, the implement itself may be equipped with position sensing equipment, and the location of the implement may be determined directly from the location fixes.

The method 200 further comprises tracking the location of the agricultural activity (block 220). The location of the agricultural activity can be as large as a field or other agricultural area, or as small as the precise location of a location fix, limited only by the precision of the position sensing device(s) used.

In one aspect, the location of the agricultural activity can be tracked from the location fixes of the implement. In certain embodiments, multiple location fixes are obtained over the duration of the agricultural activity, and the location of the agricultural activity can be thought of, in such embodiments, the location of each of the fixes (to the precision allowed by the position sensing device) and/or as the path defined by these multiple location fixes, with a cross-section defined by the width of the implement (and/or those portions of the implement that actually disturb the soil). In particular embodiments, the length of the path traversed by the agricultural vehicle (as defined by the location fixes) may be tracked, and/or multiplied by the width of the implement (and/or the effective cross-sectional width of the agricultural activity, in cases such as spraying, etc.) can be used to determine a surface area of land affected by the agricultural activity.

Hence, based on the location of the agricultural activity, the method 200 can include tracking portions of the soil actually disturbed by the agricultural activity (block 225), as opposed to merely considering the entire field to be disturbed by the agricultural activity. Hence, certain embodiments can provide a much greater level of precision when identifying exactly how much soil is disturbed by agricultural activity such as conservation tilling. For example, using the techniques described herein, embodiments can track the portions of a tilled field that are actually disturbed by the tilling activity to within a horizontal precision of about 15 cm, and in some cases, to within a horizontal position of about 3 cm.

The method 200 may further comprise creating a visual record of the agricultural activity and/or its location (block 230). In an embodiment, a camera or other image capture device (which may be integrated in and/or controlled by a mobile unit) can be used to create a visual record, for example, by capturing an image of the tilling activity. Merely by way of example, in a set of embodiments, every time the system obtains a location fix, it might also capture an image of the implement performing the agricultural activity. In another embodiment, the system correlates the visual record of the activity with positional data (such as one or more location fixes) (block 235). In this way, for example, in a carbon trading scheme requiring verification of an agricultural activity (such as conservation tilling), the system can create both a record demonstrating the area that has been tilled by conservation tilling and visual evidence that conservation tilling was actually performed in the specified area. In an aspect, the system might maintain a series of database records, each corresponding to a location fix, and the system might further store the visual records (e.g., images) in each record, in order to correlate the visual record of the activity with the position data (the location fixes).

In some embodiments, the method 200 further comprises monitoring one or more soil conditions (and/or other environmental conditions, as described below) at the location of the agricultural activity (block 240). Merely by way of example, a mobile unit might be configured to collect data from one or more sensors, including without limitation soil moisture sensors, soil temperature sensors, ambient air temperature sensors, air moisture content (humidity) sensors, wind sensors, carbon dioxide sensors, and/or the like. In a set of embodiments, the system might collect data on one or more ambient conditions (including soil conditions) every time a location fix is obtained, thus generating a plurality of soil condition samples (block 245). Each of these samples may be correlated with the corresponding location fix, for example as described above with respect to correlating visual records with positional data.

As noted above, in some cases, a mobile unit might be equipped with vehicle emission sensors, fuel consumption sensors, and/or the like. Similarly, the method 200 might comprise tracking greenhouse gas emissions of an agricultural vehicle involved in the agricultural activity (block 250). Greenhouse gases might comprise any of a variety of emitted compounds recognized by governmental (or other) authorities as contributing to climate change, as well as any other pollutants the monitoring of which is deemed appropriate. A variety of systems and techniques are available for monitoring vehicle emissions, and any such systems or techniques can be used in accordance with various embodiments.

At block 255, the method 200 comprises transmitting collected data from the mobile system, to be received by the carbon tracking server. In an aspect, the collected data might comprise a plurality of location fixes, together with correlated visual records, soil monitoring sample data, and/or the like. Other data, including date/time information, identification of the agricultural activity and/or an entity performing the activity, vehicle emissions data, and/or the like may be collected and transmitted in this fashion. In another aspect, the data might comprise one or more data sets, each of which includes data about the location of the agricultural activity and one or more soil conditions at the location of the agricultural activity. Each data set might include other relevant data, including without limitation any of the data collected by the mobile unit that is relevant to the processes undertaken by the carbon tracking server.

Figure 5:
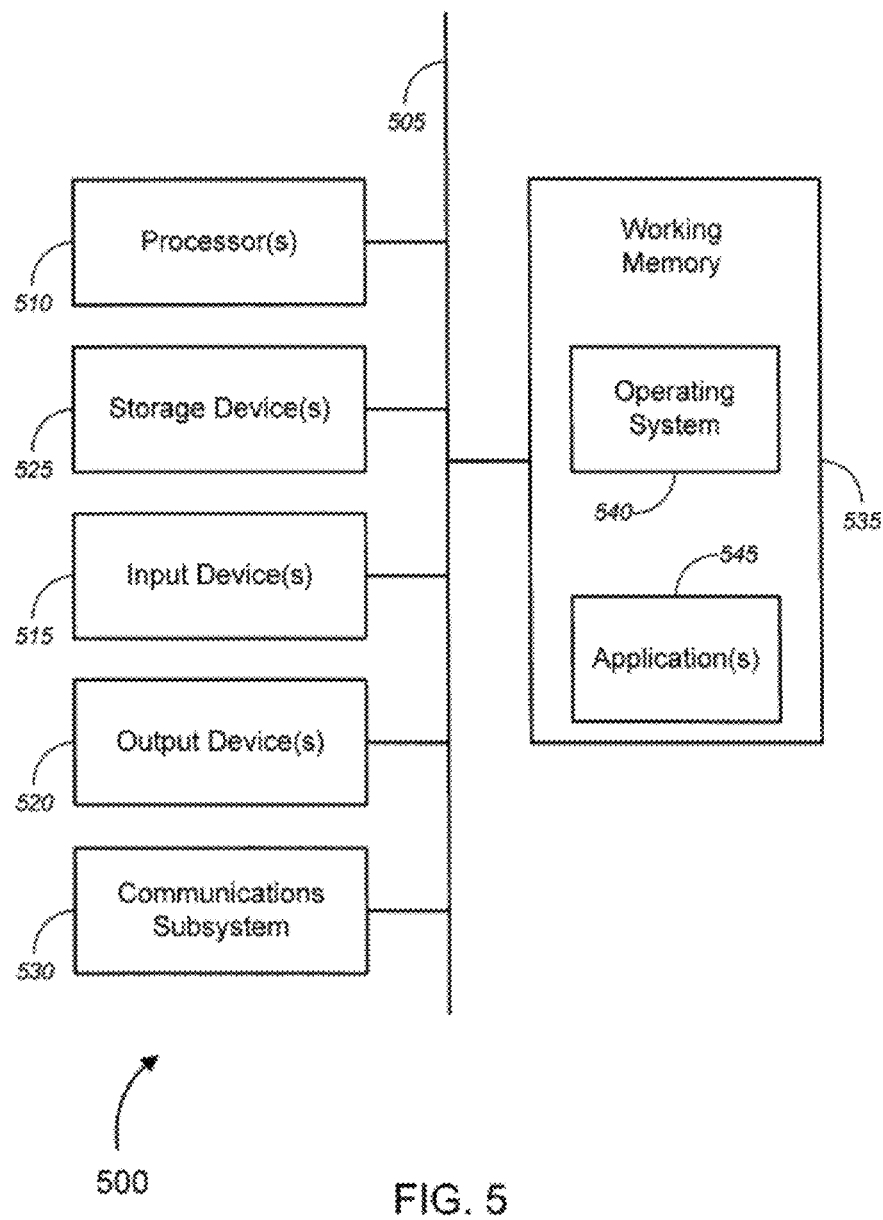
FIG. 5 is a generalized schematic diagram illustrating a computer system, in accordance with various embodiments.
Figure 6:
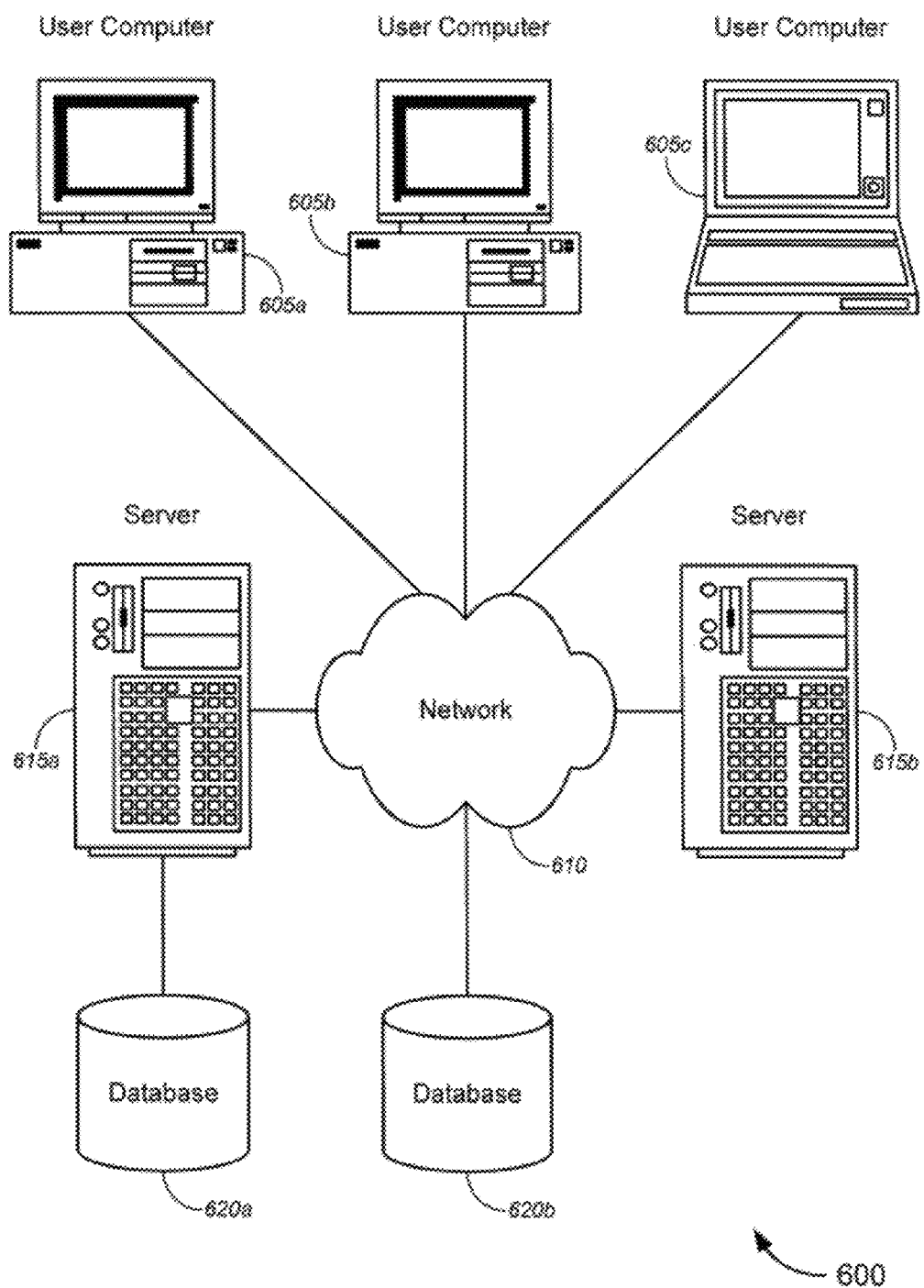
FIG. 6 is a block diagram illustrating a networked system of computers, which can be used in accordance with various embodiments.

Any available communication technology (including without limitation those described with respect to FIGS. 1, 5, and 6 herein, may be used for transmitting the collected data. Additionally, a variety of transmission techniques may be employed. Merely by way of example, the mobile unit might be configured to transmit data about an agricultural activity once the activity has been completed (either wirelessly and/or via a wired connection, which might be made when the equipment is returned from the field). Alternatively and/or additionally, the mobile unit might buffer the data and send the data when the buffer has been filled and/or when communication with the server is available. In other embodiments, the mobile unit might transmit the data in real time (or near real time) as it is collected.

FIG. 3 illustrates a method 300 of collecting data about agricultural activities that involve the application of a substance to the land and/or crops on the land, including in particular agricultural spraying activities. Many of the procedures described in conjunction with the method 300 are similar to corresponding procedures described with respect to the method 200 of FIG. 2, and, in the interest of brevity, those procedures will not be repeated in detail. For example, the method 300 might comprise identifying an agricultural implement involved in the agricultural activity (block 305), obtaining one or more location fixes (block 310), determining a position of the implement relative to the mobile unit and/or position sensing device (block 315) and tracking a location of the agricultural activity (block 320).

The method 300 might further comprise identifying the individual plants (or areas of land) to which the agricultural chemical is applied (block 325). Merely by way of example, as described above, a camera or other image capture device can be used to capture one or more images of the location of an agricultural activity (such as chemical spraying). Using pattern recognition techniques, the system can use the captured images to identify, e.g., by species and/or category (such as food and/or fiber plants or other crops, weeds, etc.), the plants that are subject to the agricultural activity. Other techniques and/or devices may be used to identify plants as well. In some cases, the identification of a particular plant or set of plants may be performed prior to undertaking the agricultural activity with respect to that plant or set of plants; this identification can inform a determination of what type of agricultural activity should be taken—e.g., what kind of chemical should be sprayed on the plant. For example, if a plant is identified as a weed, herbicide can be applied to the plant, while if the plant is identified as a crop, fertilizer can be applied to the plant.

Similar to the method 200 described above, the method 300 might also include creating a visual record of the agricultural activity and/or its location (block 330), and/or correlating the visual record with positional data (block 335). This information might also be correlated with plant identification information (e.g., information about a species and/or category of plant identified at the location).

The method 300, in some embodiments, further comprises monitoring a spraying activity at the location (block 340). In an aspect, monitoring a spraying activity at the location comprises monitoring (e.g., using a flow monitor, tank volume sensor, etc.) an amount of chemical (or water, etc.) sprayed at the location of the agricultural activity. (This location might be as large as a field or other agricultural area, or as small as the location of a single plant, limited only by the precision available from the position sensing device used.) Monitoring a spraying activity, therefore, can comprise monitoring (and/or recording data about) the amount sprayed and/or the type of substance sprayed.

At block 345, the method 300 comprises monitoring one or more environmental conditions at (or near) the location of the agricultural activity. Such environmental conditions can include soil conditions, as described above, as well as prevailing atmospheric conditions at the location of the agricultural activity. Such atmospheric conditions can include, without limitation air temperature, relative humidity (and/or air moisture content), wind velocity and/or direction, and/or the like. Such environmental conditions can affect the dispersion and/or vaporization of the applied agricultural chemicals, and by extension, the effect of those chemicals on atmospheric carbon and greenhouse gas contributions to the environment. Monitoring of the environmental conditions, and in particular atmospheric conditions, may be performed by a mobile unit, and/or may be performed by a separate weather station. In some cases, monitoring atmospheric (and/or other environmental) conditions may including acquiring weather data from public or private sources.

The method 300 can also include, like the method 200 described above, tracking vehicle emissions (block 350) and/or transmitting data (block 355). Similar to the data sets described with respect to the method 200, the data transmitted in accordance with the method 300 might comprise one or more data sets, each of which comprise information about a location of a spraying activity (or other agricultural activity), along with information about the type and/or quantity of chemical sprayed at that location, and/or information about environmental conditions at that location at the time of spraying.

Generally, once the data has been transmitted by the mobile unit, it will be received by a carbon tracking server. FIG. 4 illustrates a method 400 that may be performed by the carbon tracking server upon receiving data from a mobile unit or another device. As noted above, a carbon tracking server can process data received from a number of mobile units, some or all of which may be operating in the same agricultural area. Accordingly, it should be appreciated that while the method 400 is illustrated with respect to one data set received from one mobile unit, a carbon tracking server could perform various procedures of the method 400 (in either serial or parallel fashion) on a plurality of data sets, each of which might be received from different mobile units and/or might be associated with different agricultural operators. (As noted above, of course, a carbon tracking server may be integrated with a mobile unit, in which case the transmission and/or reception of data may be performed locally, i.e., within different components in the integrated device, and/or may be omitted altogether.)

The method 400 comprises receiving one or more sets of data (such as the data sets transmitted by mobile units, as described with respect to the methods 200 and 300, as well as any additional data relevant to the carbon tracking server's calculations) (block 405). Some or all of the received data may be stored by the carbon tracking server (block 410), e.g., in a database or other appropriate data store. This data, then, can be used by the carbon tracking server to perform analysis of the atmospheric carbon (or carbon-equivalent) impact of the agricultural activities, and/or to verify an amount of carbon credits attributable to the agricultural activities, as described in further detail below.

At block 415, the method 400 comprises calculating an area of land subject to the agricultural activity. In an aspect, this value can be calculated from the location fixes collected by the mobile unit. Merely by way of example, with respect to a tilling activity, the plurality location fixes can be used to identify a path of a tilling implement, as described above. This path, multiplied by the width of the tilling implement (and/or the individual widths of multiple groundbreaking elements within the tilling implement, if appropriate) can be used to calculate an area of the ground that was subject to the tilling activity.

The method 400 might further comprise calculating an amount of atmospheric carbon (and/or a carbon-equivalent amount) generated by the agricultural activity (block 420). With respect to tilling and other groundbreaking activities, there exist published tables that specify an amount of atmospheric carbon released per unit area of agricultural activity, and the appropriate values for activity undertaken can be obtained from such tables. By multiplying these values by the calculated area of activity, the carbon tracking server can calculate an amount of atmospheric carbon released by the activity.

For example, an aspect of some embodiments, the amount of surface area (and/or depth) affected by the agricultural activity can be used to calculate and/or estimate an amount of carbon equivalent gases emitted by the activity. In some cases, published data may be used to perform these calculations/estimates. For example, U. M. Sainju et al., "Soil Carbon Dioxide Emission as Influenced by Irrigation, Tillage, Cropping System, and Nitrogen Fertilization," *Workshop on Agricultural Air Quality* (Washington, D.C. Jun. 5-8, 1995), pp. 1086-98, which is hereby incorporated by reference, provides data on how various agricultural activities affect carbon release rates per surface area affected; these and similar data can be used to estimate carbon release from tilling and other agricultural activities. For example, in the conservation tilling context, the amount of carbon actually released (based on the surface area actually affected by the tilling) can be compared with the amount that would have been released if the entire agricultural area had been tilled (e.g., using conventional tilling techniques). The difference between these values can give rise to carbon credits. In other embodiments, the actual amount of carbon dioxide emitted can be measured (e.g., using carbon dioxide sensors in a mobile unit) and can be used to perform direct measurement on the amount of carbon dioxide emitted.

Similarly with respect to the spraying and/or application of chemicals, there are published data about the volatility of common agricultural chemicals under various environmental conditions and/or the contribution of such chemicals to atmospheric carbon and other greenhouse gas emissions. Using such data, along with data concerning the type and amount of chemicals applied, along with relevant data about prevailing environmental conditions at the time of application, the system can calculate an amount of atmospheric carbon (and/or carbon equivalents) released through the application of the agricultural chemicals. Merely by way of example, many agricultural chemicals contain significant amounts of nitrogen, and calculation of the amount of atmospheric carbon released by spraying an agricultural chemical might comprise calculating an amount of nitrogen released into the atmosphere through application of the agricultural chemical.

The calculation of atmospheric carbon (and/or carbon equivalents) generated by the agricultural activity may take account of other factors as well. Merely by way of example, some embodiments will track vehicle fuel consumption and/or emissions, as noted above. The greenhouse gas emissions of the vehicle can be calculated from the fuel consumption and/or vehicle emissions, using any of a variety of techniques, some of which are described in provisional U.S. Pat. App. 61/298,779 and are incorporated herein by reference. For example, data about carbon output of common agricultural vehicles is often published, and a mobile unit can track parameters such as travel time, operating time, and the like, and using published data, calculate estimated values of carbon output from the vehicle. In other situations, the mobile unit might be in communication with a vehicle data bus, which can allow for more precise tracking of fuel consumption and/or direct monitoring of vehicle emissions, from which carbon output can be derived using conventional techniques.

In an aspect of some embodiments, therefore, calculating the amount of atmospheric carbon generated by the agricultural activity can include calculating a carbon equivalent amount generated by the vehicle, based least in part on the greenhouse gas emissions of the vehicle. Similarly, a variety of other factors may be taken into account when calculating atmospheric carbon generated by the agricultural activity. As noted above, an entity involved in agricultural operations may be eligible for carbon credits if that entity undertakes conservation practices, such as conservation tilling. For example, if an entity engages in conservation tilling instead of traditional tilling, that entity may be eligible for carbon credits, based on the amount of land tilled by conservation tilling rather than conventional tilling, and/or on the amount of carbon released by the conservation tilling, as compared to the amount of carbon that would have been released by conventional tilling. To qualify for such carbon credits, however, the conservation activity often needs to be verified, to ensure that the entity is actually engaged in the conservation practice.

Accordingly, the method 400 may comprise verifying a carbon credit amount that is attributable to the monitored agricultural activity (block 425). In one aspect, this verification may depend on the calculated area of land that was subject to the agricultural activity, and/or the calculated amount of carbon/carbon equivalents released into the atmosphere by the agricultural activity. In another aspect, the verification may depend on visual record of the agricultural activity, which can provide evidence, for example, that conservation tilling (as opposed to traditional tilling) was undertaken.

Thus, for example, verifying a carbon credit amount can comprise calculating an amount of carbon credits attributable to a presumed agricultural activity, as well as verifying that the presumed agricultural activity occurred, and/or the amount of the agricultural activity that actually occurred. The amount of carbon credits attributable to the agricultural activity may be specified by a prevailing market rate, by government regulation, and/or the like. The amount of credits that can be attributed to the activity, therefore, may be calculated by multiplying the amount of credit available per unit of activity (whether specified by land area, amount of soil actually disturbed, and/or the like) by the amount of activity undertaken, as reflected by the data received from the mobile units and/or information derived from such data.

At block 430, the method 400 comprises generating output. In accordance with various embodiments, many different kinds of output may be generated. Merely by way of example, in some embodiments, the output might comprise information about the agricultural activity and/or the amount of activity undertaken (such as, the amount of land tilled, the type and/or amount of chemicals applied, prevailing environmental conditions, the amount of fuel used by agricultural vehicles involved in the activity, the fuel usage rate and/or emissions of those vehicles, and/or the like). In other embodiments, the output might comprise information about the amount of atmospheric carbon (and/or carbon equivalents) generated by the agricultural activity. In yet other embodiments, the output might comprise information indicating the verified amount of carbon credits attributable to the agricultural activity. In further embodiments, the output might comprise data pertaining to a carbon sequestration rate of the agricultural activity (such as a conservation tilling activity).

In some cases, the output might include yield monitoring data (e.g., data on the amount of crop harvested), which can be used to derive information on the amount of carbon fixing performed by the crops. (Such data can also be used when calculating the impact on atmospheric carbon of certain agricultural activities, or the carbon credits attributable to such activities.) The processes of the Calvin Cycle for carbon fixation are plants is well-known, and most plants use either $C_3$ or $C_4$ carbon fixation to "fix" atmospheric carbon in order to add biomass to the plant.

The amount of carbon fixed by a particular crop plant will depend, first and foremost, on the mass (yield) of the harvested crop, but also several other factors that can include plant genotype, soil chemistry, soil moisture, ambient temperature, relative humidity, barometric pressure, and nutrient inputs. If such factors can be measured and/or estimated, the amount of atmospheric carbon fixed in that crop can be determined (e.g., calculated and/or estimated), for example by associating these factors with the geography and time of the agricultural activity and then establishing a correlation between these factors and the crop biochemistry and/or yield.

Because various embodiments provide sensors that can measure many of these factors (as described in further detail above), certain embodiments can include carbon fixation of the harvested crop in the calculation of the overall effect of the agricultural activity on atmospheric carbon, and/or in the calculation of carbon credits attributable to the activity. Such information can also be provided by the carbon tracking server as output.

Thus, based on the disclosure herein, one skilled in the art can appreciate that a variety of different types of output may be generated in accordance with different embodiments.

Likewise, a variety of different output techniques may be used to generate output, in accordance with different embodiments. Merely by way of example, in one embodiment, generating output might comprise transmitting data pertaining to the verified amount of carbon credit attributable to the conservation tilling activity (block 435). Such data may be transmitted through data interface, such as the data interface described above, and/or through any other appropriate data exchange technique, including without limitation a web service, electronic mail, and/or the like. This data can be transmitted to a regulatory body, climate exchange, carbon credit aggregator, and/or the like; such output can facilitate the monitoring, trading, etc. of such carbon credits using conventional techniques.

In another set of embodiments, generating output can comprise producing output for a user, including without limitation, producing output to be displayed for the user. Accordingly, in certain embodiments, the method 400 comprises providing a user interface (block 440), which can be used to display generated output for a user's review.

As noted above, a user interface to allow interaction between a user and carbon tracking server (or another computer) that can provide the generated output for the user. For example, the user interface can be used to output information for a user, e.g., by displaying the information on a display device, printing information with a printer, playing audio through a speaker, etc.; the user interface can also function to receive input from a user, e.g., using standard input devices such as mice and other pointing devices, motion capture devices, touchpads and/or touchscreens, keyboards (e.g., numeric and/or alphabetic), microphones, etc. The procedures undertaken to provide a user interface, therefore, can vary depending on the nature of the implementation; in some cases, providing a user interface can comprise displaying the user interface on a display device; in other cases, however, in which the user interface is displayed on a device remote from the computer system (such as on a client computer, wireless device, etc.), providing the user interface might comprise formatting data for transmission to such a device and/or transmitting, receiving and/or interpreting data that is used to create the user interface on the remote device. Alternatively and/or additionally, the user interface on a client computer (or any other appropriate user device) might be a web interface, in which the user interface is provided through one or more web pages that are served from a computer system (and/or a web server in communication with the computer system), and are received and displayed by a web browser on the client computer (or other capable user device). The web pages can display output from the computer system and receive input from the user (e.g., by using Web-based forms, via hyperlinks, electronic buttons, etc.). A variety of techniques can be used to create these Web pages and/or display/receive information, such as JavaScript, Java applications or applets, dynamic HTML and/or AJAX technologies, to name but a few examples.

As noted above, in an aspect of certain embodiments, the user interface provides interaction between a user and a computer system. Hence, when this document describes procedures for displaying (or otherwise providing) information to a user, or to receiving input from a user, the user interface may be the vehicle for the exchange of such input/output.

The method 400, then, can also comprise instructions to provide for the display of data (which can include, without limitation, any of the different types of output described above) for a user (block 445). As noted above, a variety of different user interfaces can be used to provide for the display of data for a user. Merely by way of example, in some embodiments, the system might comprise a web server, and the method 400 might comprise causing the web server to generate a web page comprising the output.

FIG. 5 provides a schematic illustration of one embodiment of a computer system 500 that can perform the methods provided by various other embodiments, as described herein, and/or can function as a mobile unit, carbon tracking server, and/or the like. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements may include one or more processors 510, including without limitation one or more general-purpose processors and/or one or more special-purpose processors (such as digital signal processing chips, graphics acceleration processors, and/or the like); one or more input devices 515, which can include without limitation a mouse, a keyboard and/or the like; and one or more output devices 520, which can include without limitation a display device, a printer and/or the like.

The computer system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 500 might also include a communications subsystem 530, which can include without limitation a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer systems, and/or with any other devices described herein. In many embodiments, the computer system 500 will further comprise a working memory 535, which can include a RAM or ROM device, as described above.

The computer system 500 also may comprise software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 500) to perform methods in accordance with various embodiments of the invention. According to a set of embodiments, some or all of the procedures of such methods are performed by the computer system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operation in a specific fashion. In an embodiment implemented using the computer system 500, various computer readable media might be involved in providing instructions/code to processor(s) 510 for execution and/or might be used to store and/or carry such instructions/code (e.g., as signals). In many implementations, a computer readable medium is a non-transitory, physical and/or tangible storage medium. Such a medium may take many forms, including but not limited to, non-volatile media, volatile media, and transmission media. Non-volatile media includes, for example, optical and/or magnetic disks, such as the storage device(s) 525. Volatile media includes, without limitation, dynamic memory, such as the working memory 535. Transmission media includes, without limitation, coaxial cables, copper wire and fiber optics, including the wires that comprise the bus 505, as well as the various components of the communication subsystem 530 (and/or the media by which the communications subsystem 530 provides communication with other devices). Hence, transmission media can also take the form of waves (including without limitation radio, acoustic and/or light waves, such as those generated during radio-wave and infrared data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500. These signals, which might be in the form of electromagnetic signals, acoustic signals, optical signals and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 510 retrieves and executes the instructions. The instructions received by the working memory 535 may optionally be stored on a storage device 525 either before or after execution by the processor(s) 510.

FIG. 6 illustrates a schematic diagram of a system 600 that can be used in accordance with one set of embodiments. The system 600 can include one or more user computers 605. A user computer 605 can be a general purpose personal computer (including, merely by way of example, desktop computers, laptop computers, handheld computers, and the like, running any appropriate operating system, several of which are available from vendors such as Apple, Microsoft Corp., and the like) and/or a workstation computer running any of a variety of commercially-available UNIX™ or UNIX-like operating systems. In addition, a mobile unit, as described above, might comprise a user computer, as that term is used with respect to FIG. 6. A user computer 605 can also have any of a variety of applications, including one or more applications configured to perform methods provided by various embodiments (as described above, for example), as well as one or more office applications, database client and/or server applications, and/or web browser applications. Alternatively, a user computer 605 can be any other electronic device, such as a thin-client computer, Internet-enabled mobile telephone, and/or personal digital assistant, capable of communicating via a network (e.g., the network 610 described below) and/or of displaying and navigating web pages or other types of electronic documents. Although the exemplary system 600 is shown with three user computers 605, any number of user computers can be supported.

Certain embodiments operate in a networked environment, which can include a network 610. The network 610 can be any type of network familiar to those skilled in the art that can support data communications using any of a variety of commercially-available (and/or free or proprietary) protocols, including without limitation TCP/IP, SNA™, IPX™, AppleTalk™, and the like. Merely by way of example, the network 610 can include a local area network ("LAN"), including without limitation a fiber network, an Ethernet network, a Token-Ring™ network and/or the like; a wide-area network; a wireless wide area network ("WWAN"); a virtual network, such as a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments can also include one or more server computers 615. Each of the server computers 615 may be configured with an operating system, including without limitation any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 may be a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including without limitation web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including without limitation those commercially available from Oracle™, Microsoft™, Sybase™, IBM™ and the like, which can process requests from clients (including, depending on the configuration, dedicated database clients, API clients, web browsers, etc.) running on a user computer 605 and/or another server 615. In some embodiments, an application server can create web pages dynamically for displaying the information in accordance with various embodiments, such as output generated by a carbon tracking server, to name one example. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620. The location of the database(s) 620 is discretionary: merely by way of example, a database 620a might reside on a storage medium local to (and/or resident in) a server 615a (and/or a user computer 605). Alternatively, a database 620b can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A system, comprising:
 a mobile unit, comprising:
  a position sensing device configured to track a location of a conservation tilling activity;
  a soil monitoring device configured to monitor one or more soil conditions at the location of the conservation tilling activity; and
  a first communication system configured to transmit a set of data about the location of the conservation tilling activity and the one or more soil conditions at the location of the conservation tilling activity; and
 a server computer in communication with the mobile unit, the server computer comprising:
  a second communication system configured to receive the set of data about the location of the conservation tilling activity and the one or more soil conditions at the location of the conservation tilling activity;
  a data store for storing the set of data;
  a processor in communication with the second communication system and the data store; and
  a computer readable medium having stored thereon a set of instructions executable by the processor to cause the server computer to perform one or more operations, the set of instructions comprising:
   instructions to store the set of data at the data store;
   instructions to calculate, based at least in part on the set of data, an amount of atmospheric carbon released by the conservation tilling activity;
   instructions to verify, based at least in part on the calculated amount of carbon released by the conservation tilling activity, a carbon credit amount attributable to the conservation tilling activity; and
   instructions to generate output indicating the verified amount of carbon credit attributable to the conservation tilling activity.

2. The system of claim 1, wherein the mobile unit is mounted on an agricultural vehicle.

3. The system of claim 2, wherein the location of the conservation tilling activity is a location of an agricultural implement associated with the agricultural vehicle, and wherein the position sensing device is configured to track a location of the agricultural implement.

4. The system of claim 3, wherein the soil monitoring device is mounted on the implement.

5. The system of claim 3, wherein the mobile unit is configured to identify the implement.

6. The system of claim 5, wherein the mobile unit further comprises a camera, and wherein identifying the implement comprises identifying the implement based at least in part on visual pattern recognition.

7. The system of claim 5, wherein the mobile unit further comprises a radio frequency identification ("RFID") receiver, and wherein identifying the implement comprises identifying the implement based at least in part on signals received by the RFID receiver.

8. The system of claim 5, wherein identifying the implement comprises identifying the implement based at least in part on user input.

9. The system of claim 5, wherein tracking a location of a conservation tilling activity comprises determining a position of the implement relative to the position sensing device, based at least in part on identification of the implement.

10. The system of claim 2, wherein the computer system is remote from the location of the conservation tilling activity, the system further comprising a base station proximate to the location of the conservation tilling activity, the base station being configured to provide communication between the mobile unit and the computer system.

11. The system of claim 2, wherein the mobile unit further comprises an emission tracking device configured to track greenhouse gas emissions of the agricultural vehicle.

12. The system of claim 11, wherein the instructions to calculate an amount of atmospheric carbon generated by the conservation tilling activity comprise instructions to calculate a carbon-equivalent amount based on the greenhouse gas emissions of the agricultural vehicle.

13. The system of claim 1, wherein the position sensing device comprises a global navigation satellite system ("GNSS") receiver.

14. The system of claim 1, wherein the position sensing device comprises a camera, and wherein tracking a location of a conservation tilling activity comprises creating a visual record of the location of the conservation tilling activity.

15. The system of claim 14, wherein tracking a location of a conservation tilling activity further comprises correlating the visual record of the location of the conservation tilling activity with positional data.

16. The system of claim 1, wherein tracking a location of a conservation tilling activity comprises obtaining a plurality of location fixes throughout a duration of the conservation tilling activity.

17. The system of claim 16, wherein monitoring one or more soil conditions at the location of the conservation tilling activity comprises sampling the one or more soil conditions to produce a plurality of soil condition samples, each of the plurality of soil condition samples corresponding to a different one of the plurality of location fixes.

18. The system of claim 16, wherein the instructions to calculate an amount of atmospheric carbon released by the conservation tilling activity comprise instructions to calculate an area of land subject to the conservation tilling activity, based at least in part on the plurality of location fixes.

19. The system of claim 1, wherein tracking a location of a conservation tilling activity comprises tracking, within a tilled field, portions actually disturbed by the conservation tilling activity.

20. The system of claim 19, wherein tracking portions actually disturbed by the conservation tilling activity comprise tracking the portions to within a level of horizontal precision of about fifteen centimeters.

21. The system of claim 19, wherein tracking portions actually disturbed by the conservation tilling activity comprise tracking the portions to within a level of horizontal precision of about three centimeters.

22. The system of claim 1, wherein the one or more soil conditions comprise one or more soil conditions selected from the group consisting of soil temperature, ambient air temperature, soil moisture content, and ambient air moisture content.

23. The system of claim 1, wherein the mobile unit comprises an agricultural chemical monitor configured to track an amount of an agricultural chemical applied to the location of conservation tilling activity.

24. The system of claim 23, wherein the instructions to calculate an amount of atmospheric carbon released by the conservation tilling activity comprise instructions to calculate an amount of nitrogen released by application of the agricultural chemical.

25. The system of claim 1, wherein the instructions to generate output comprise instructions to transmit, to a third party, data pertaining to the verified amount of carbon credit attributable to the conservation tilling activity.

26. The system of claim 1, wherein the instructions to generate output comprise instructions to transmit, to a carbon credit aggregator, data pertaining to the verified amount of carbon credit attributable to the conservation tilling activity.

27. The system of claim 1, wherein the instructions to generate output comprise instructions to transmit, to a regulatory body, data pertaining to the verified amount of carbon credit attributable to the conservation tilling activity.

28. The system of claim 1, wherein the instructions to generate output comprise instructions to provide for the display, for a user, of data pertaining to the verified amount of carbon credit attributable to the conservation tilling activity.

29. The system of claim 28, wherein the instructions to provide for the display of data pertaining to the verified amount of carbon credit attributable to the conservation tilling activity comprise instructions to display data pertaining to a carbon sequestration rate of the conservation tilling activity.

30. The system of claim 28, wherein the instructions to provide for the display of data pertaining to the verified amount of carbon credit attributable to the conservation tilling activity comprise instructions to display data pertaining to a fuel usage rate of an agricultural vehicle associated with the conservation tilling activity.

31. The system of claim 28, further comprising a web server, wherein the instructions to provide for the display of data pertaining to the verified amount of carbon credit attributable to the conservation tilling activity comprise instructions to cause the web server to generate a web page comprising the data pertaining to the verified amount of carbon credit attributable to the conservation tilling activity.

32. A method, comprising:
tracking, with a position sensing device, a location of a conservation tilling activity;
monitoring, with a monitoring device, one or more soil conditions at the location of the conservation tilling activity;
calculating, with a computer system, an amount of atmospheric carbon released by the conservation tilling activity, based at least in part on data about the location of the conservation tilling activity and the one or more soil conditions at the location of the conservation tilling activity;
verifying, based at least in part on the calculated amount of carbon released by the conservation tilling activity, a carbon credit amount attributable to the conservation tilling activity; and
generating output indicating the verified amount of carbon credit attributable to the conservation tilling activity.

33. A system, comprising:
a mobile unit, comprising:
a position sensing device configured to track a location of an agricultural spraying activity;
a chemical monitoring device configured to monitor an amount of an agricultural chemical sprayed as part of the agricultural spraying activity; and
a first communication system configured to transmit a set of data about the location of agricultural spraying activity and the amount of the agricultural chemical being applied at the location of the agricultural spraying activity; and
a server computer in communication with the mobile unit, the server computer comprising:
a second communication system configured to receive the set of data about the location of the agricultural spraying activity and the amount of the agricultural chemical being sprayed as part of the agricultural spraying activity;
a data store for storing the set of data;
a processor in communication with the second communication system and the data store; and
a computer readable medium having stored thereon a set of instructions executable by the processor to cause the server computer to perform one or more operations, the set of instructions comprising:
instructions to store the set of data at the data store;
instructions to calculate, based at least in part on the set of data, an amount of atmospheric carbon equivalent generated by the agricultural spraying activity;
instructions to verify, based at least in part on the calculated amount of atmospheric carbon equivalent generated by the agricultural spraying activity; and
instructions to generate output indicating the verified amount of carbon credit attributable to the agricultural spraying activity.

34. The system of claim 33, wherein:
the mobile unit further comprises a sensor to identify a type of the agricultural chemical; and
the set of data further comprises information about the type of agricultural chemical.

35. The system of claim 33, wherein the agricultural chemical is selected from the group consisting of a herbicide and a fertilizer.

36. A system, comprising:
a server computer in communication with a mobile unit, the server computer comprising:
a communication system configured to receive a set of data about a location of a conservation tilling activity and one or more soil conditions at the location of the conservation tilling activity;
a data store for storing the set of data;
a processor in communication with the communication system and the data store; and
a computer readable medium having stored thereon a set of instructions executable by the processor to cause the server computer to perform one or more operations, the set of instructions comprising:
instructions to store the set of data at the data store;
instructions to calculate, based at least in part on the set of data, an amount of atmospheric carbon released by the conservation tilling activity;
instructions to verify, based at least in part on the calculated amount of carbon released by the conservation tilling activity, a carbon credit amount attributable to the conservation tilling activity; and
instructions to generate output indicating the verified amount of carbon credit attributable to the conservation tilling activity.

37. A system, comprising: a mobile unit local to an agricultural vehicle, the mobile unit comprising:
- a position sensing device configured to track a location of a conservation tilling activity;
- a soil monitoring device configured to monitor one or more soil conditions at the location of the conservation tilling activity; and
- a first communication system configured to transmit a set of data about the location of the conservation tilling activity and the one or more soil conditions at the location of the conservation tilling activity; and
- a computer system local to the agricultural vehicle and in communication with the mobile unit, the computer system comprising:
- a second communication system configured to receive the set of data about the location of the conservation tilling activity and the one or more soil conditions at the location of the conservation tilling activity;
- a data store for storing the set of data;
- a processor in communication with the communication system and the data store; and
- a computer readable medium having stored thereon a set of instructions executable by the processor to cause the server computer to perform one or more operations, the set of instructions comprising:
- instructions to store the set of data at the data store;
- instructions to calculate, based at least in part on the set of data, an amount of atmospheric carbon released by the conservation tilling activity;
- instructions to verify, based at least in part on the calculated amount of carbon released by the conservation tilling activity, a carbon credit amount attributable to the conservation tilling activity; and
- instructions to generate output indicating the verified amount of carbon credit attributable to the conservation tilling activity.

38. The system of claim 37, wherein the mobile unit and the computer system are integrated in a single device installed on the agricultural vehicle.

* * * * *